DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1364

T889,013

ADHERENCE OF ALKALI-RESISTANT RESIN TO HARDENED GELATIN LAYERS

William C. Gray, Jr., and Frederick A. Stahly, both % Eastman Kodak Co., Kodak Park Division, Rochester, N.Y. 14650

Filed Sept. 17, 1970, Ser. No. 73,178
**Int. Cl. G03c *1/48***
U.S. Cl. 96—76
No Drawing. 12 Pages Specification

The bonding of alkali-resistant, resinous coatings, such as those comprising poly(vinyl acetal), poly(vinyl butyrol), poly(vinyl formal), copolymers of vinyl chloride and vinyl acetate, and copolymers of vinyl chloride and vinylidene chloride, to hardened gelatin layers is improved by the incorporation of relatively small amounts of isocyanate crosslinking agents, such as tolylene diisocyanate, hexamethylene diisocyanate, octamethylene diisocyanate, 4,4′-diisocyanato-3,3′-dimethyldiphenylmethane, and various polyisocyanates, in the resinous coating. Alkali-resistant resin-coated hardened gelatin layers find particular usage in reception elements in color image transfer processes, since such coatings can withstand prolonged contact with alkaline processing compositions and will remain firmly bonded to the hardened gelatin layer.

Receiving layers, silver halide emulsions and elements coated as described can be chemically sensitized, e.g., with noble metal sensitizers alone or in combination with sulfur or selenium sensitizers. They can contain spectral sensitizers, incorporated color-forming couplers, incorporated developing agents, other antifoggants, hardeners, plasticizers, other coating aids, vinyl polymers, and other suitable photographic addenda such as described in U.S. Pat. 3,297,446 of Dunn issued Jan. 10, 1967 (columns 4–9).